INVENTOR
ARNOLD S. CHARLAT
BY
ATTORNEYS

INVENTOR
ARNOLD S. CHARLAT
ATTORNEYS

Oct. 10, 1961 A. S. CHARLAT 3,003,165
TOOL SPINDLE DRIVE MEANS FOR SEQUENTIALLY EFFECTING
RAPID APPROACH, WORK FEED AND RAPID WITHDRAWAL
Filed April 21, 1959 16 Sheets-Sheet 7

INVENTOR
ARNOLD S. CHARLAT
BY
ATTORNEYS

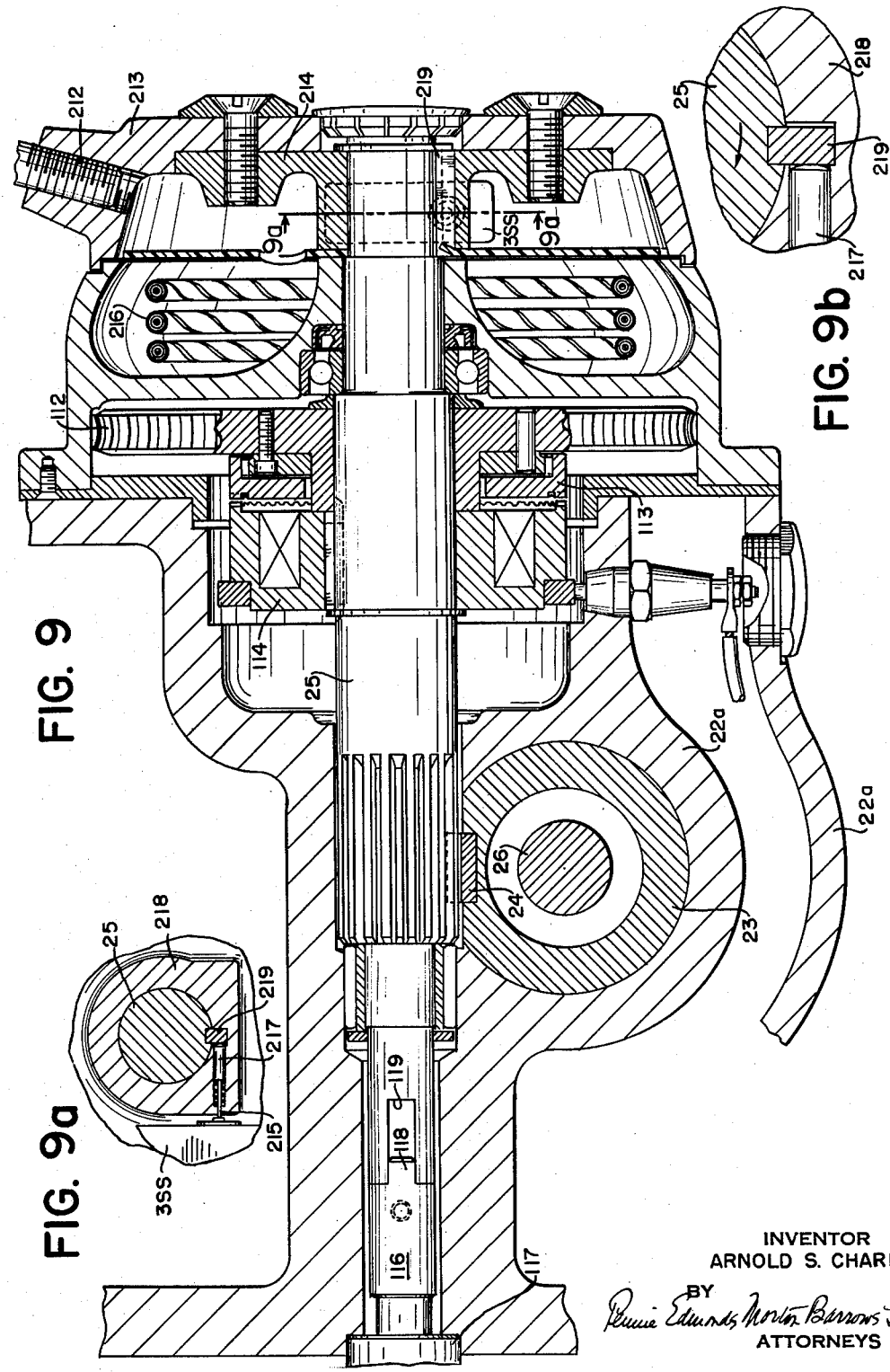

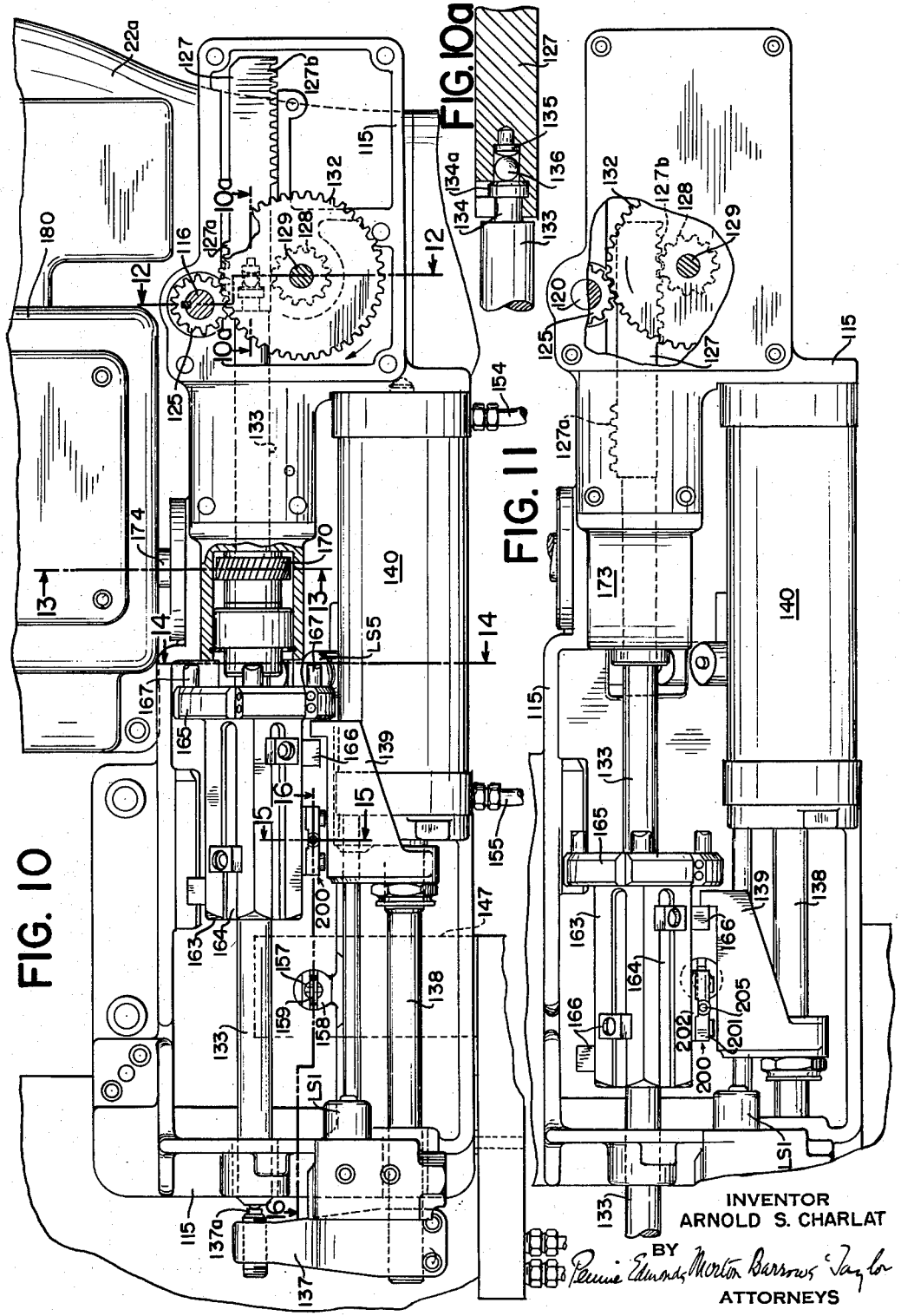

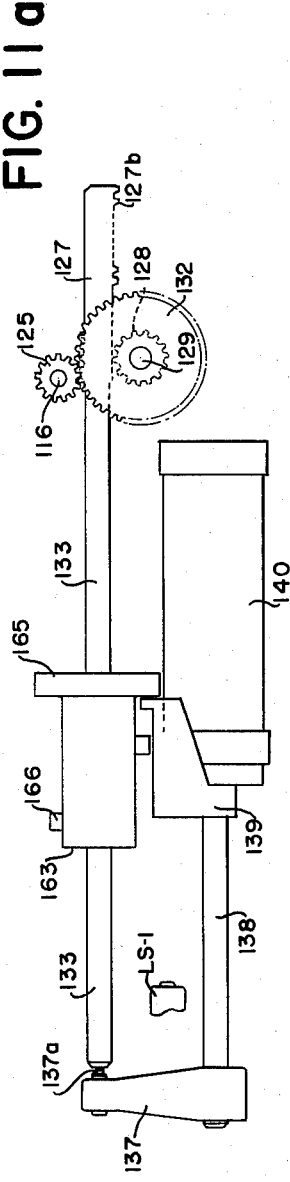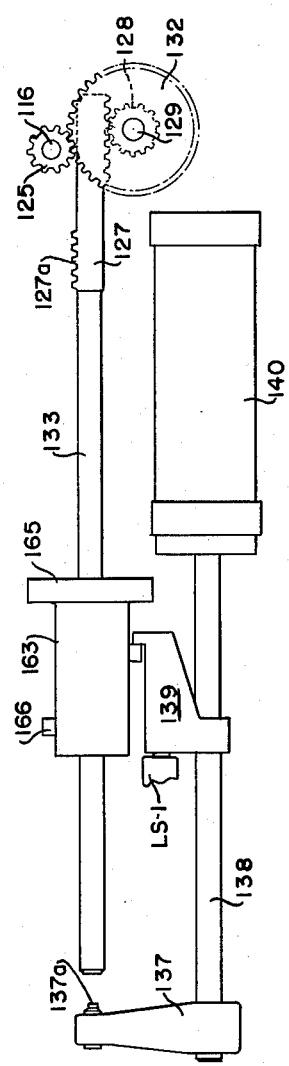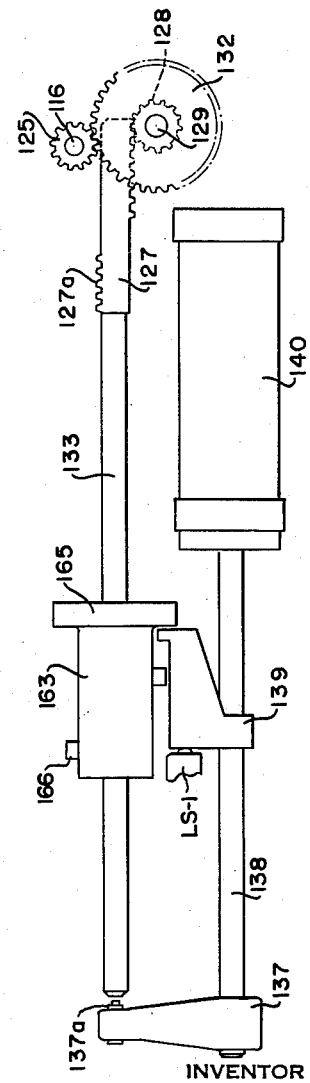

Oct. 10, 1961  A. S. CHARLAT  3,003,165
TOOL SPINDLE DRIVE MEANS FOR SEQUENTIALLY EFFECTING
RAPID APPROACH, WORK FEED AND RAPID WITHDRAWAL
Filed April 21, 1959  16 Sheets-Sheet 11

INVENTOR
ARNOLD S. CHARLAT
BY
ATTORNEYS

INVENTOR
ARNOLD S. CHARLAT

Oct. 10, 1961 A. S. CHARLAT 3,003,165
TOOL SPINDLE DRIVE MEANS FOR SEQUENTIALLY EFFECTING
RAPID APPROACH, WORK FEED AND RAPID WITHDRAWAL
Filed April 21, 1959 16 Sheets-Sheet 14

INVENTOR
ARNOLD S. CHARLAT
BY
ATTORNEYS

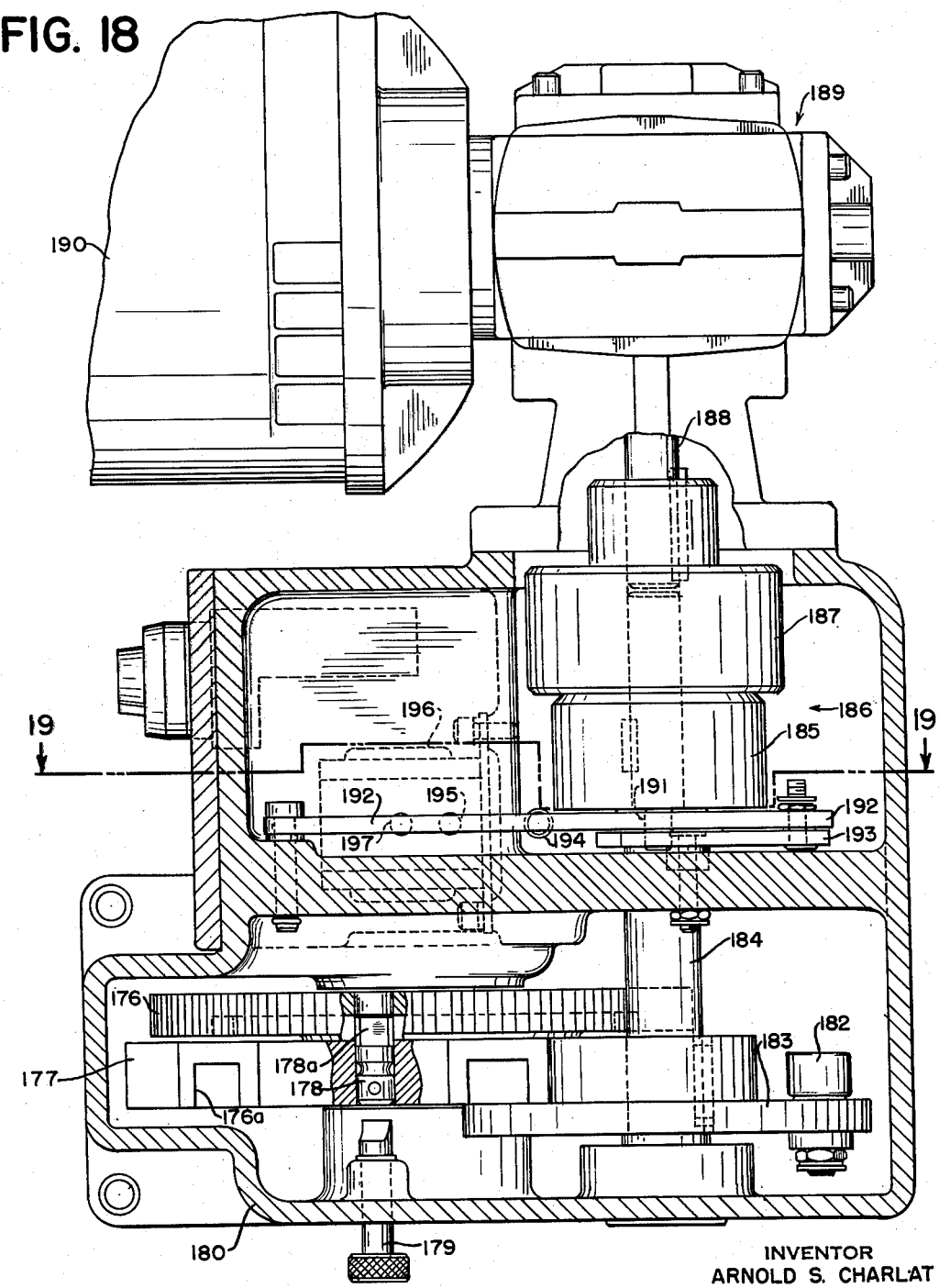

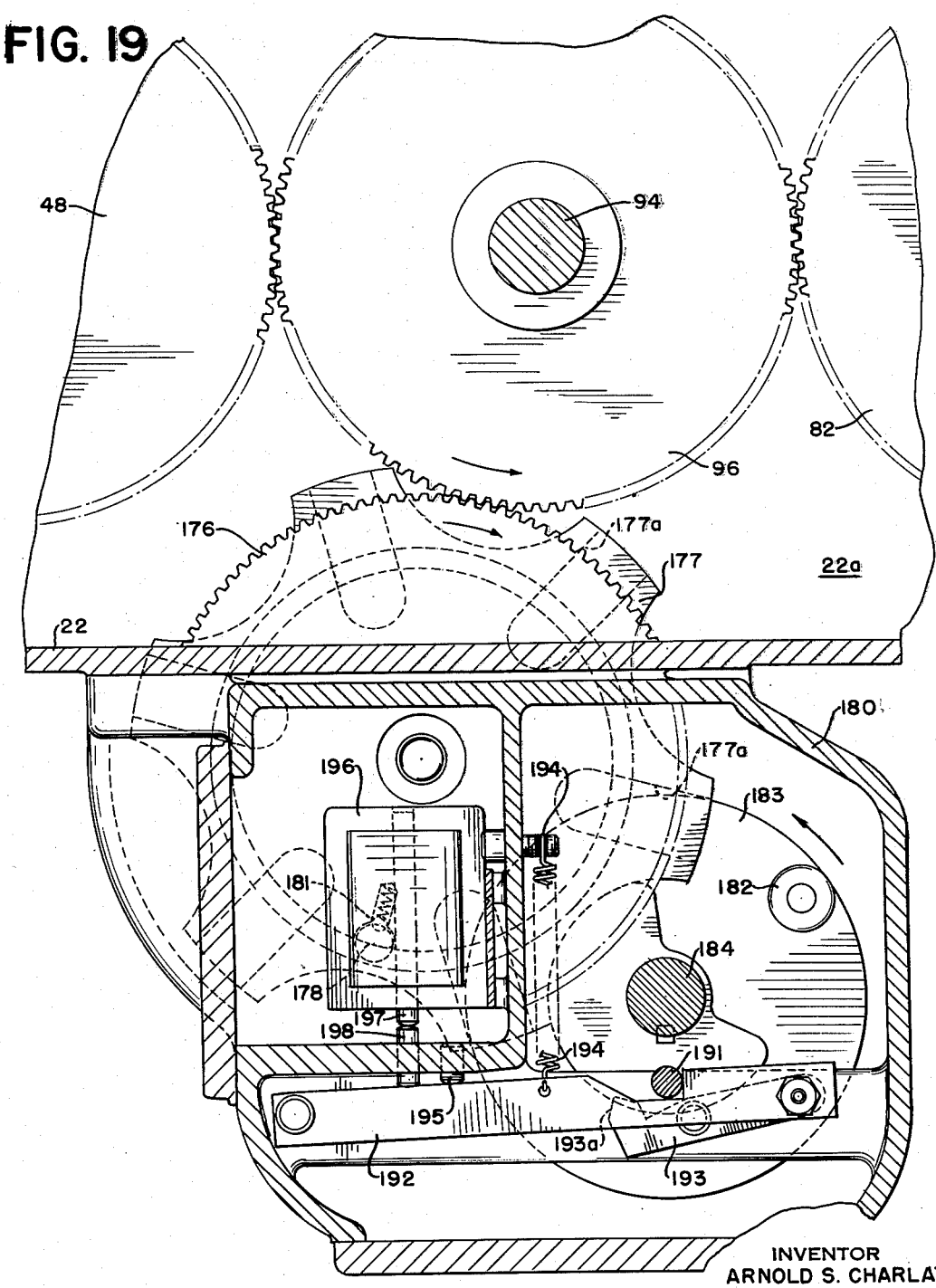

United States Patent Office 3,003,165
Patented Oct. 10, 1961

3,003,165
TOOL SPINDLE DRIVE MEANS FOR SEQUEN-
TIALLY EFFECTING RAPID APPROACH, WORK
FEED AND RAPID WITHDRAWAL
Arnold Samuel Charlat, Norwalk, Conn., assignor, by
mesne assignments, to Brown & Sharpe Manufacturing
Company, Providence, R.I., a corporation of Rhode
Island
Filed Apr. 21, 1959, Ser. No. 807,935
13 Claims. (Cl. 10—128)

This invention relates to machines for performing operations on workpieces by means of tools and having cooperating tool holding and workpiece supporting members, which are relatively movable toward and away from each other to present the tool to and remove it from the workpiece and one of which is rotatable to cause the operation to be performed. More particularly, the invention is concerned with a machine of the stated type having novel means for producing the relative movement of the members and for driving the rotatable member, which increase the efficiency of the machine and reduce the amount of manual labor required in its use.

Machines, in which the invention may be incorporated, may be divided into two classes, an example of a machine of the first class being a turret lathe, in which the workpiece supporting member is rotated to perform the operation, while the tool holding member carries a plurality of tools usable selectively and held against rotation during the operation. A typical machine of the second class is one for drilling, tapping, and like purposes, in which the tool holding member may carry a plurality of tools usable selectively with the tool in effective position rotated to perform the operation on the workpiece held stationary on the workpiece supporting member. In machines of the two classes, the workpiece supporting member may be moved toward and away from the tool holding member, as in a lathe, the opposite arrangement may be used, as in a drilling machine, or both members may be moved. All the advantages of the invention are realized, when it is embodied in a drilling machine having a plurality of tools mounted for selective use in a rotary turret, and a form of such a machine will, accordingly, be illustrated and described in detail for purposes of explanation.

For a better understanding of the invention, reference may be made to the accompanying drawings, in which FIG. 1 is a view in side elevation of a turret drilling machine embodying the invention;

Figure 1:
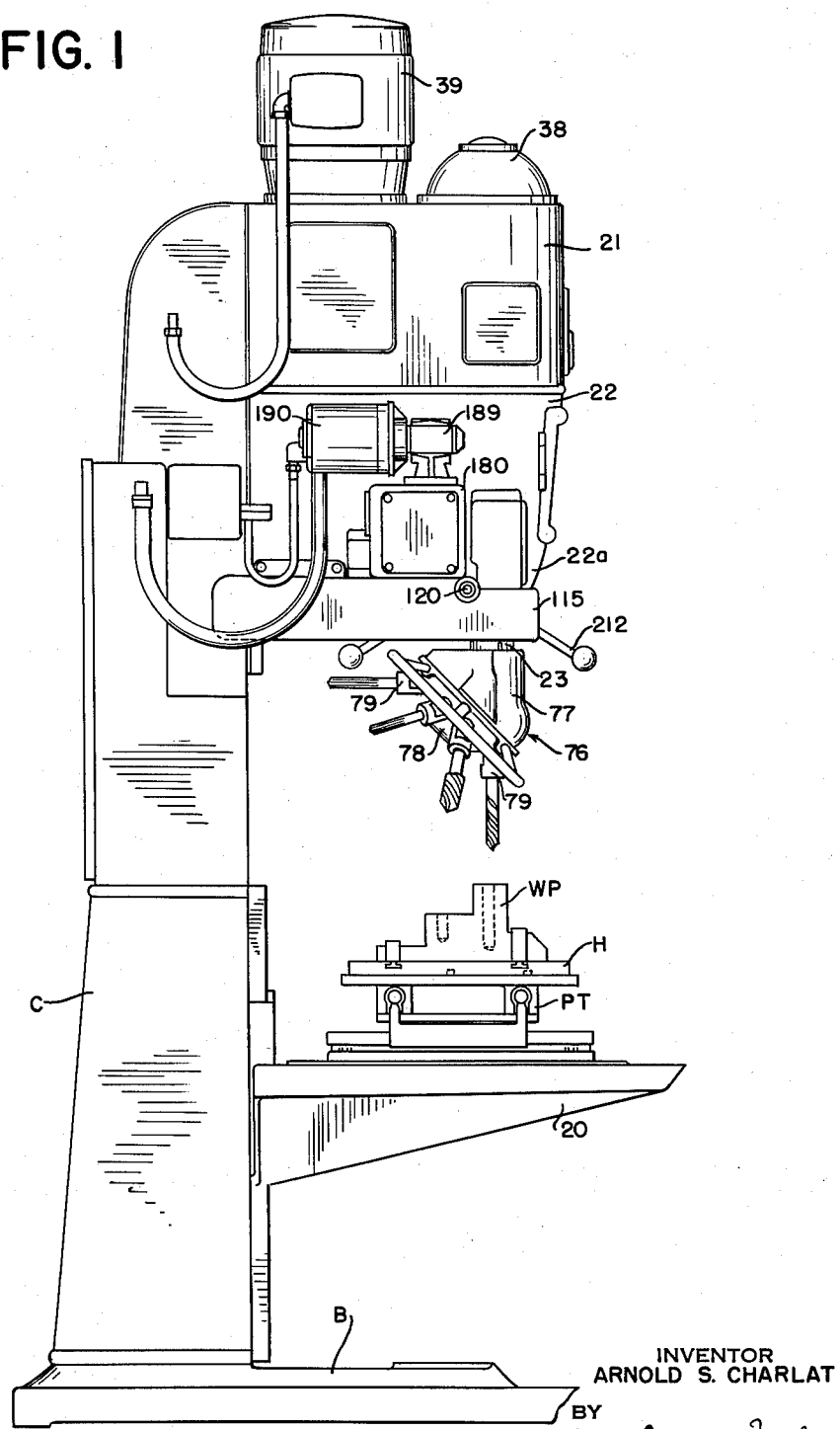
Figure 2:
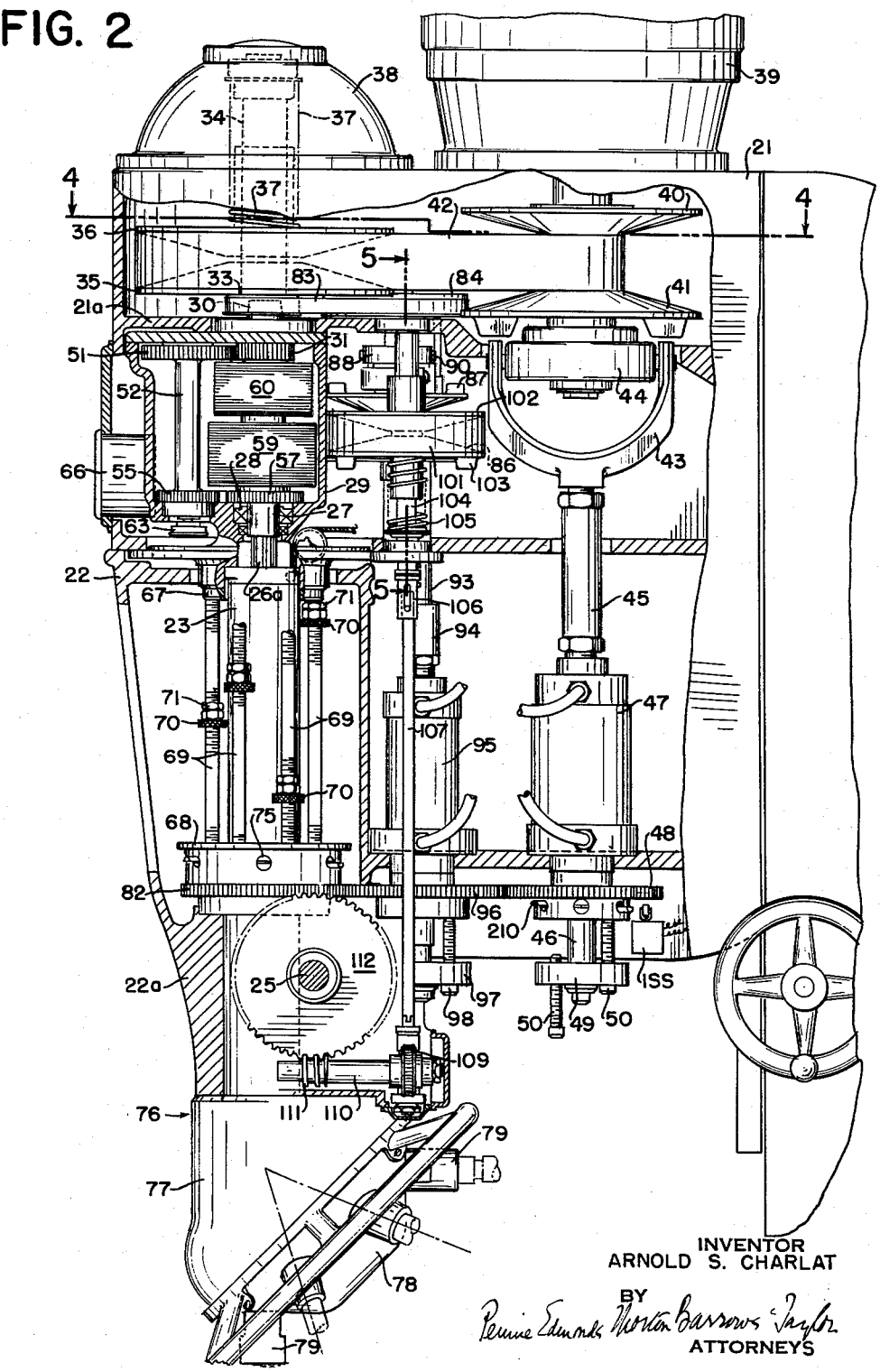
FIG. 2 is a view in side elevation with parts broken away of the major features of the machine.
Figure 3:
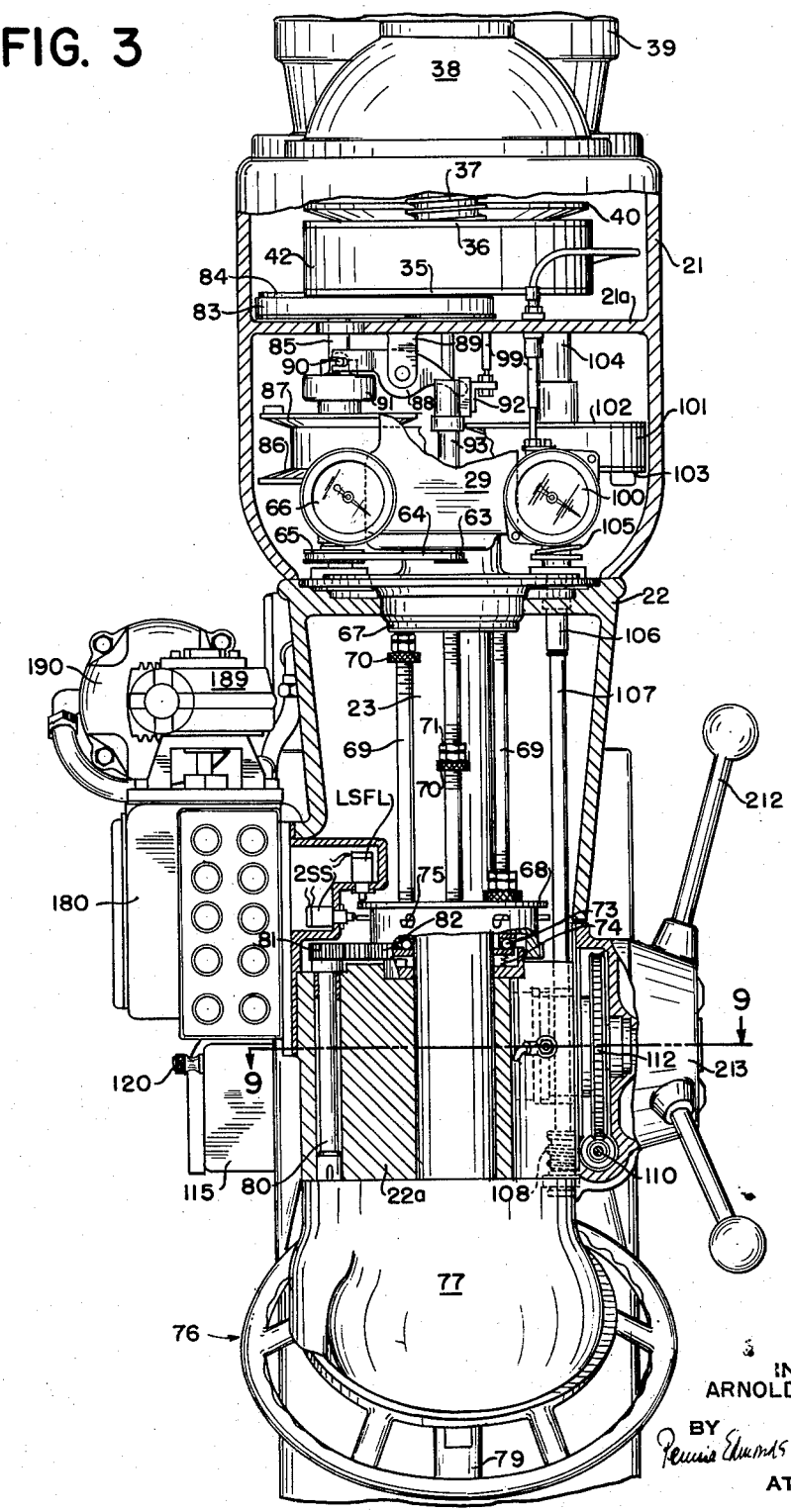
FIG. 3 is a fragmentary elevational view with parts broken away and at right angles to FIG. 2.
Figure 4:
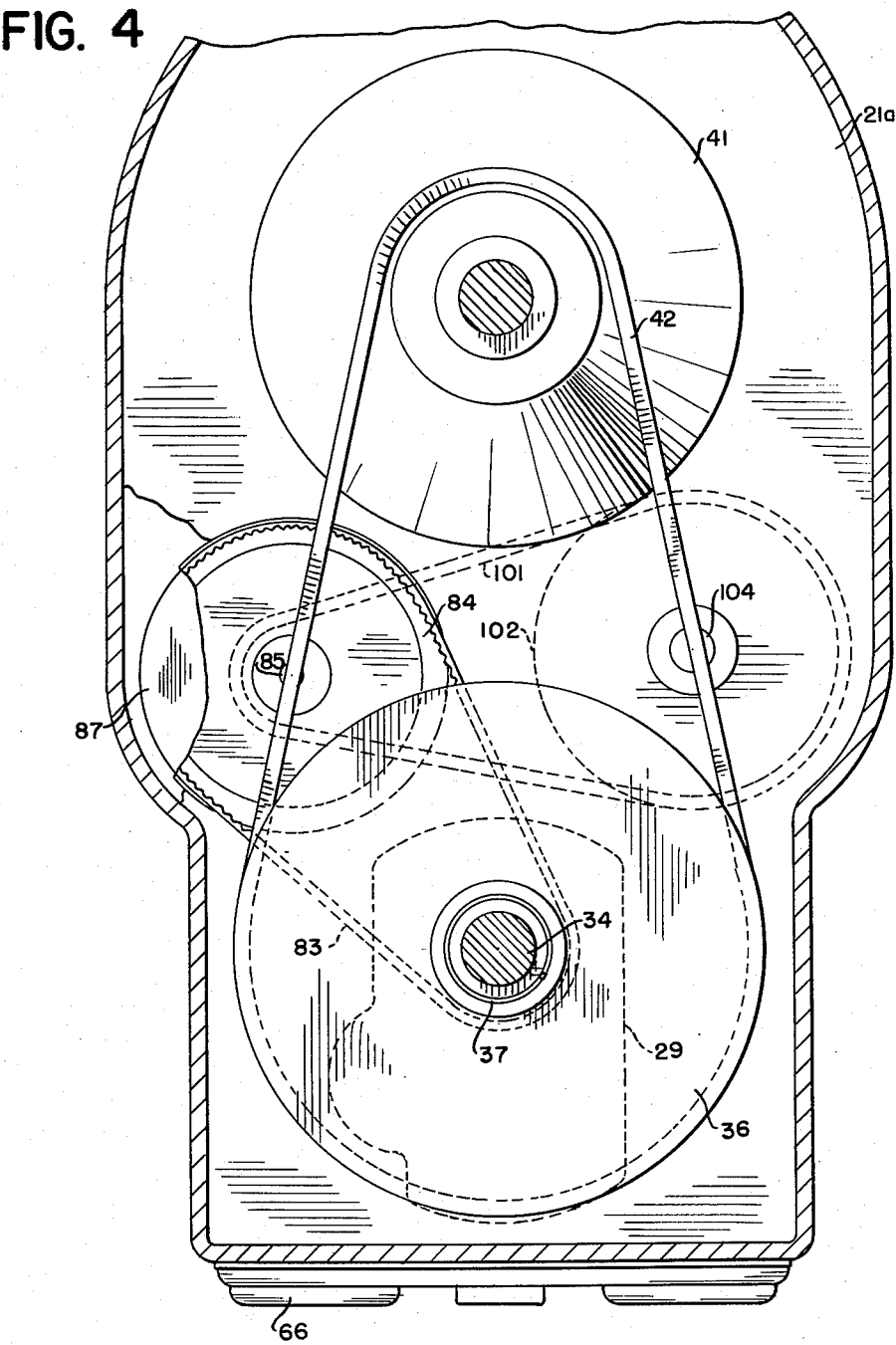
Figure 5:
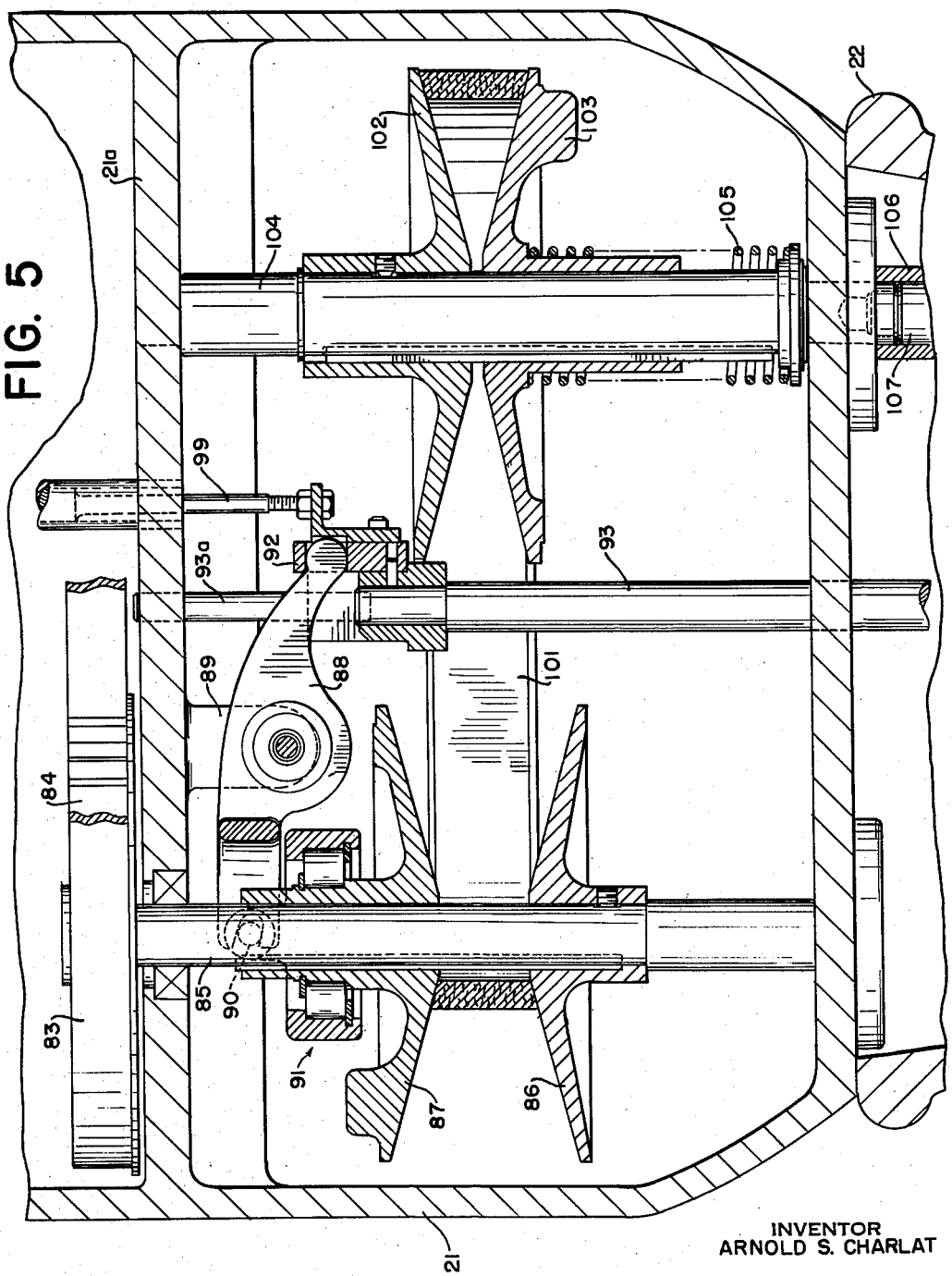
Figure 6:
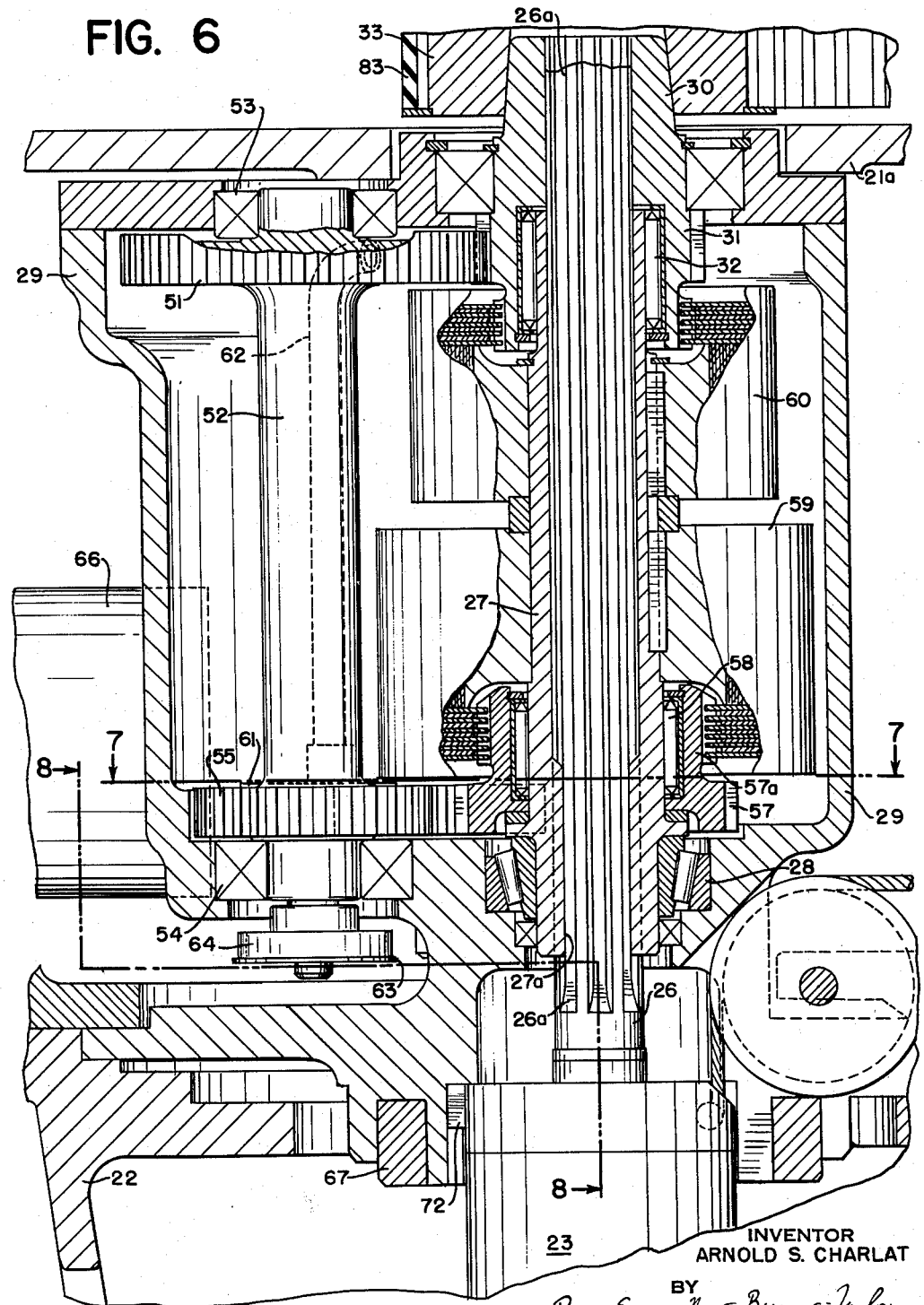
Figure 7:
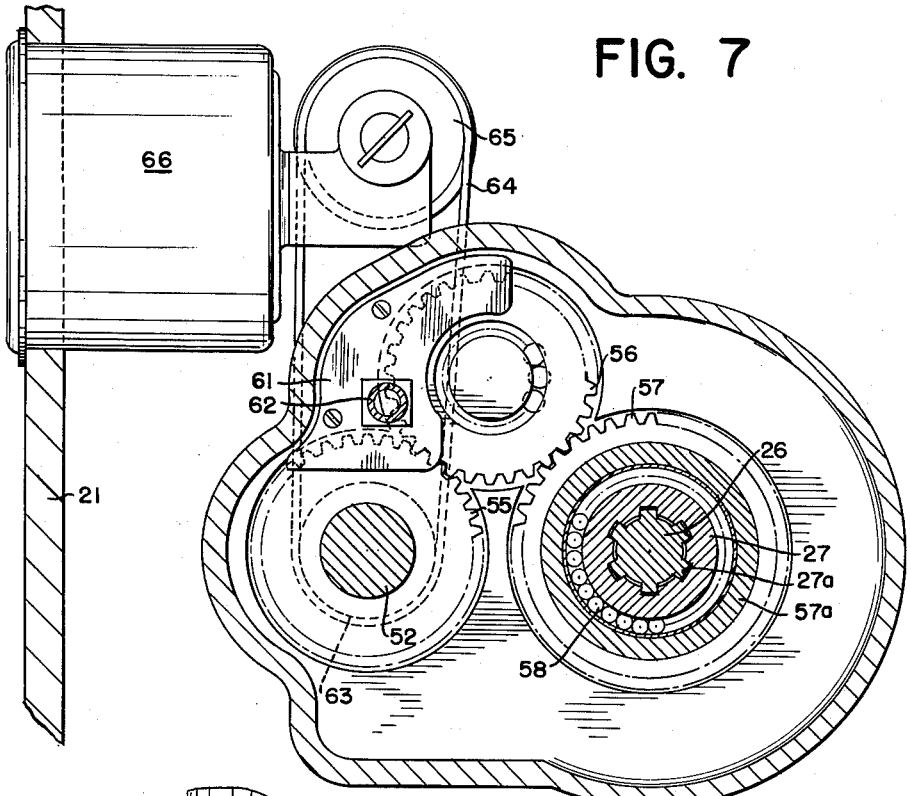
Figure 8:
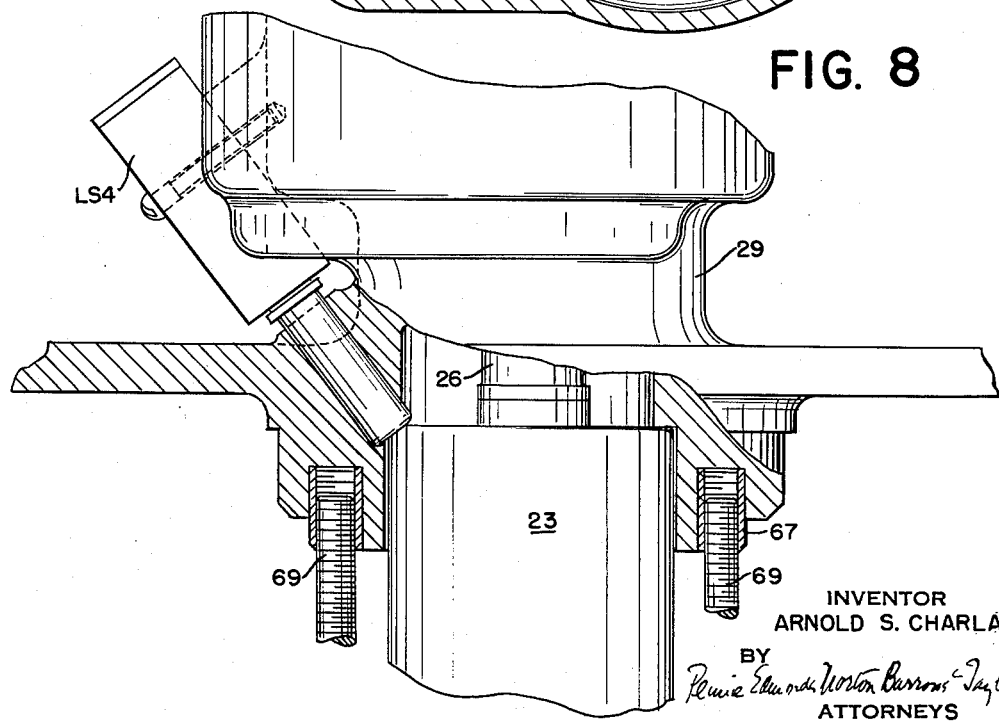
Figure 12:
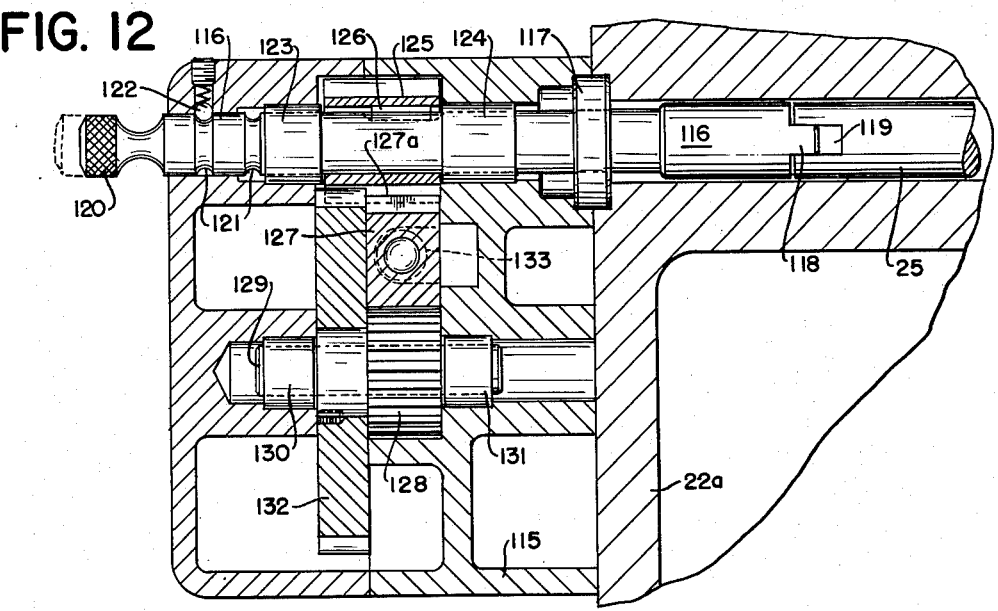
Figure 13:
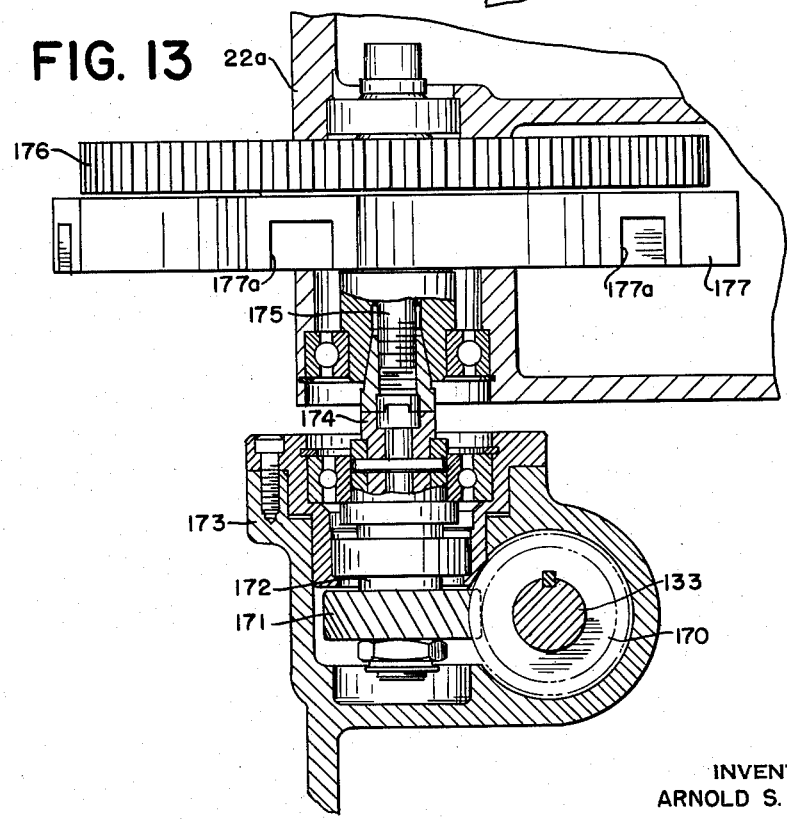
Figure 14:
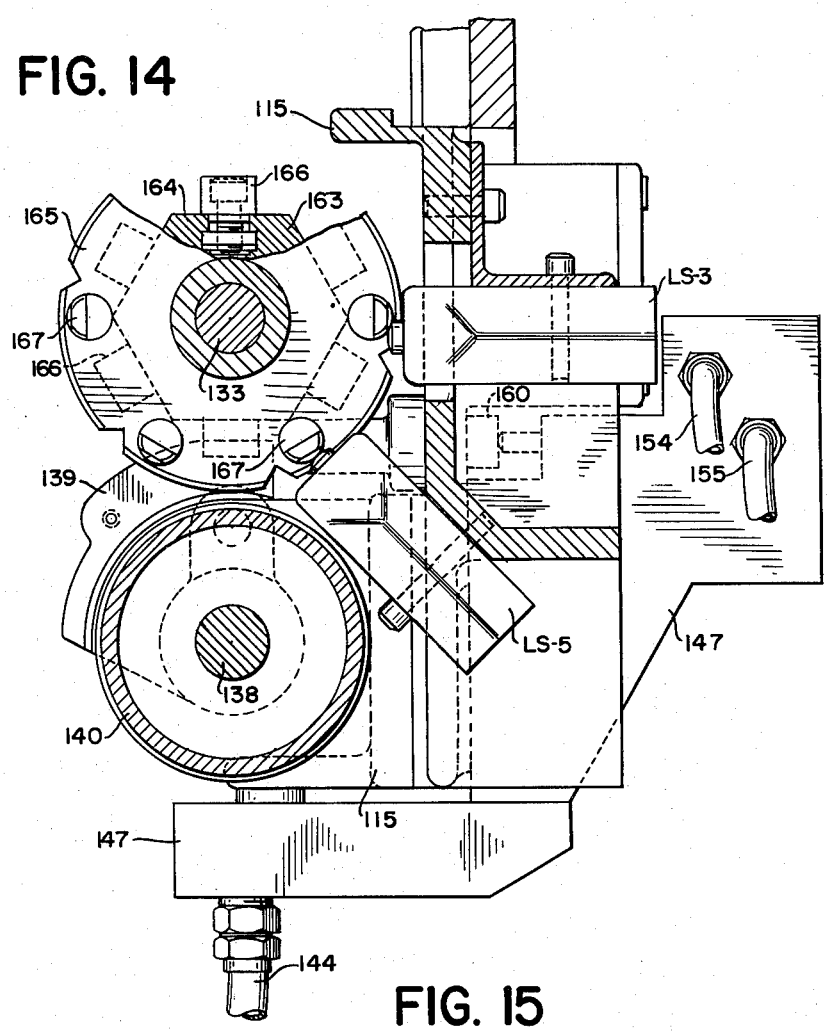
Figure 15:
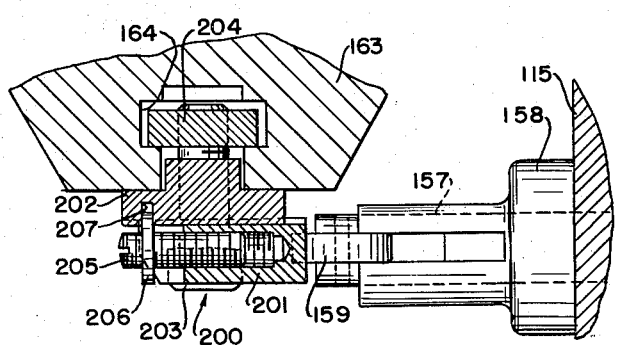
Figure 16:
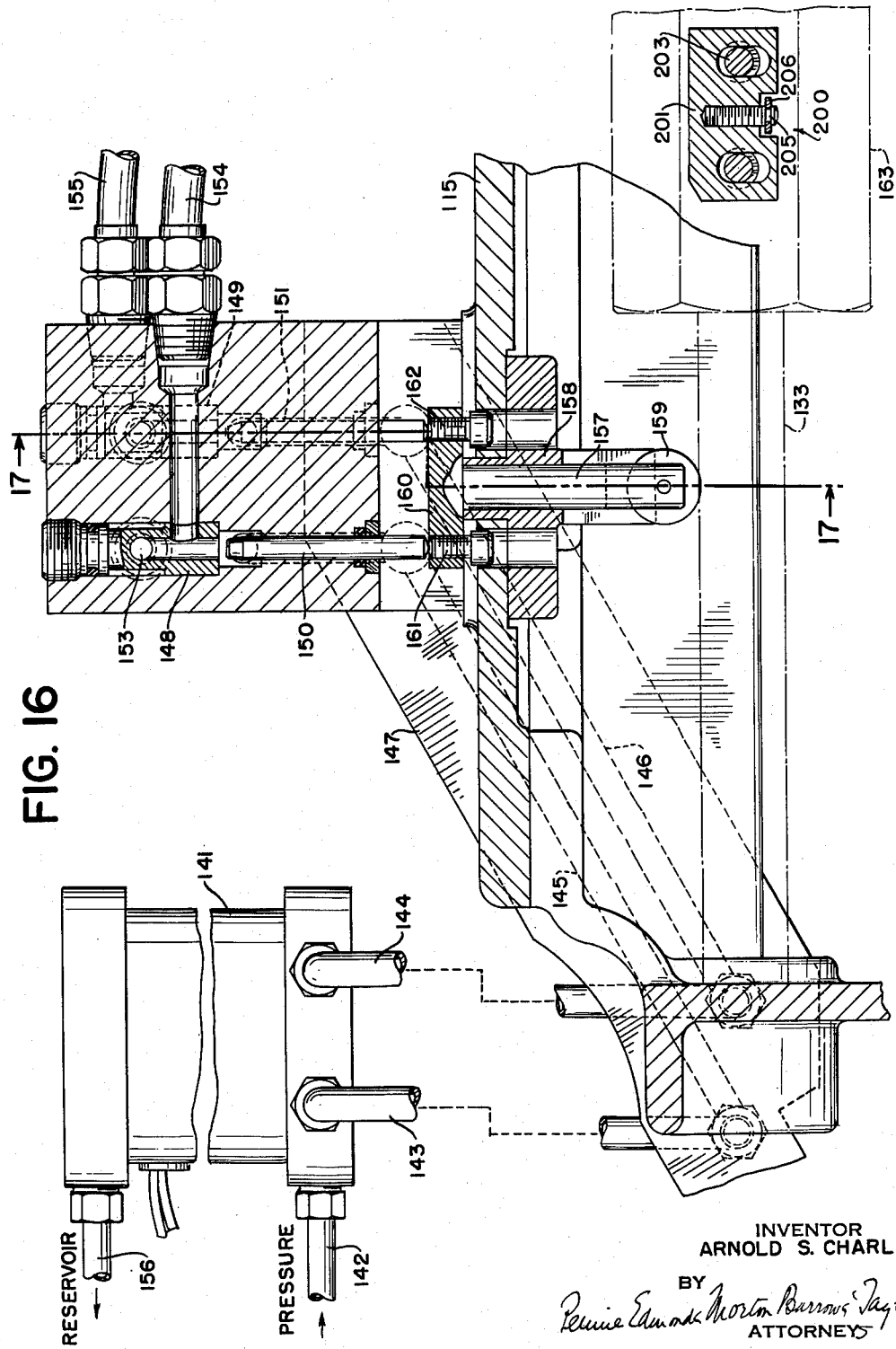
Figure 17:
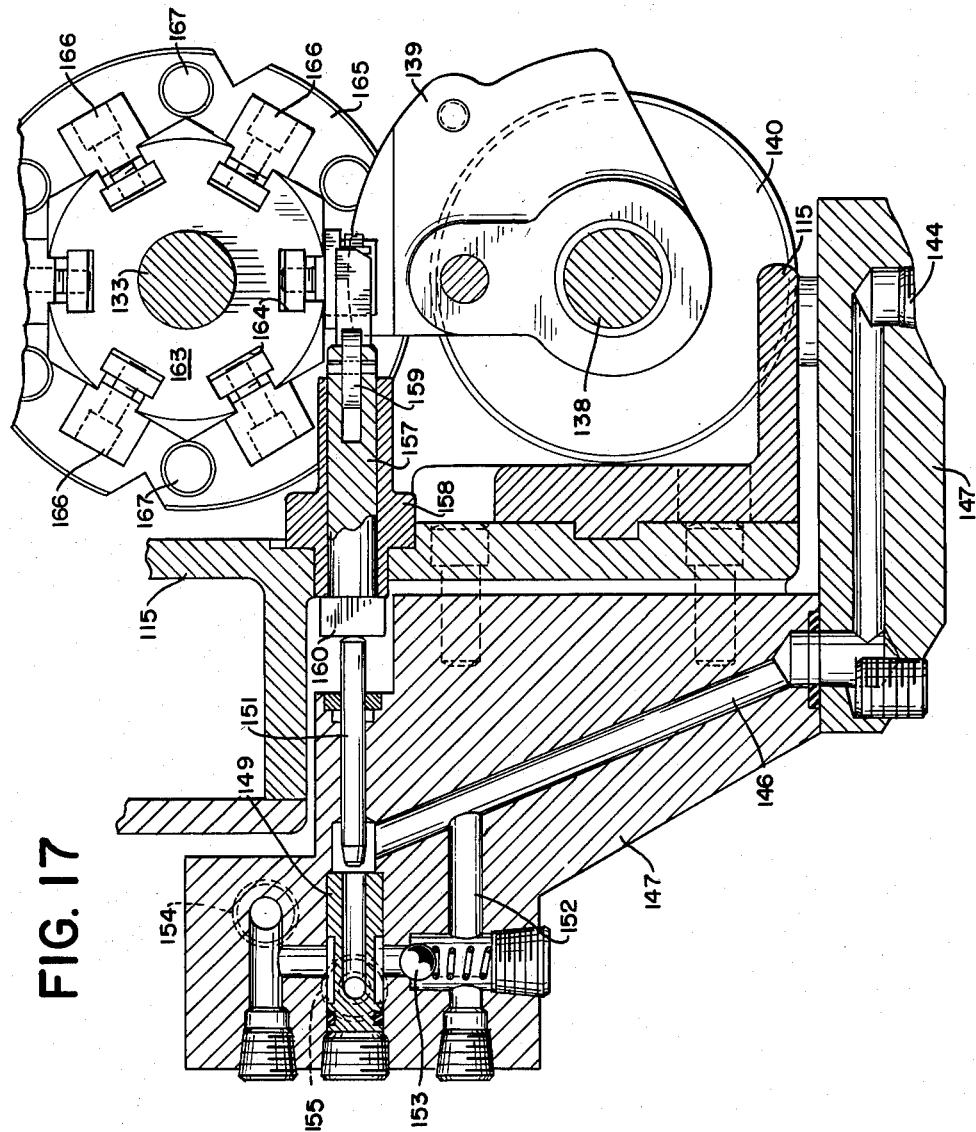

FIGS. 4 and 5 are sectional views on the lines 4—4 and 5—5, respectively, of FIG. 2;

FIG. 6 is an elevational view with parts broken away of the spindle drive mechanism;

FIGS. 7 and 8 are sectional views on the lines 7—7 and 8—8, respectively, of FIG. 6;

FIG. 9 is a sectional view on the line 9—9 of FIG. 3;

FIG. 9a is a sectional view on the line 9a—9a of FIG. 9;

FIG. 9b is a fragmentary view similar to FIG. 9a but showing the parts in different positions;

FIG. 10 is a view, partly in elevation and partly in section, showing part of the feeding mechanism for advancing and retracting the quill;

FIG. 10a is a sectional view on the line 10a—10a of FIG. 10;

FIG. 11 is a view similar to FIG. 10 but showing the parts in different positions;

FIGS. 11a, 11b, and 11c are diagrammatic elevational views showing the operation of the mechanism of FIGS. 10 and 11;

FIGS. 12, 13, 14, 15, and 16 are sectional views on the lines 12—12, 13—13, 14—14, 15—15, and 16—16, respectively, of FIG. 10;

FIG. 17 is a sectional view on the line 17—17 of FIG. 16;

FIG. 18 is a view partly in side elevation and partly in vertical section of the power indexing mechanism; and FIG. 19 is a sectional view on the line 19—19 of FIG. 18.

The drilling machine illustrated includes a column C rising from a base B and a table 20 mounted on the column for vertical adjustment. The table serves as the member for supporting the workpiece WP, which is shown as secured to a holder H attached to the top of a positioning table PT which may be of the type disclosed in my copending application Ser. No. 612,545, filed September 27, 1956, now Patent 2,880,632, issued April 7, 1959. The table top is movable in a horizontal plane, so that the locations on the workpiece where operations are to be performed, can be brought beneath the tool.

An upper housing 21 and a lower housing 22 are secured to the vertical face of the column to overlie the table and the housings are secured together. A quill 23 is mounted for vertical movement in a downward extension 22a on the lower housing and the quill may be moved vertically by means of rack teeth 24 (FIG. 9) on the outer surface of the quill which mesh with teeth on a shaft 25 mounted for rotation in the extension 22a, the teeth serving as a pinion.

The main drive spindle 26 (FIG. 6) of the machine is mounted in the quill for rotation in suitable upper and lower bearings, and the upper end of the spindle extends out of the quill and is formed with splines indicated at 26a. The splined portion of the spindle extends through a sleeve 27 which is formed with integral keys 27a entering the splines and connecting the sleeve to the spindle for rotation therewith. The sleeve is mounted for rotation in a lower bearing 28 seated in a recess in a casing 29 within the upper housing and the upper end of the sleeve extends into a recess in the lower end of the elongated hub 30 of a pinion 31, a bearing generally indicated at 32 being interposed between the outer surface of the sleeve and the inner surface of the recess. At its upper end, the outer surface of the hub is tapered and it projects into and mates with a tapered bore through a toothed pinion 33 fast on a shaft 34 (FIG. 2). A pair of coned disks 35, 36 are mounted on the shaft with the lower disk 35 fast on the shaft and the upper disk secured to the shaft for rotation but movable lengthwise of the shaft. A spring 37 encircling the shaft urges the upper disk toward the lower one. The upper end of the shaft is mounted for rotation in bearings in a cap 38 mounted on the upper housing 21.

The spindle 26 is driven by a motor 39 mounted on the upper housing 21 with its shaft extending into the housing. A pair of coned disks 40, 41 are mounted on the motor shaft with the upper disk 40 fast on the shaft and the lower disk 41 keyed to the shaft for rotation therewith but freely movable lengthwise of the shaft. A belt 42 encircles the motor shaft and the shaft 34 and the edges of the belt engage the exposed faces of the disks 35, 36 and disks 40, 41. The lower disk 41 is moved toward the disk 40 by a yoke 43, the arms of which carry a bearing 44 engaging the disk 41. The yoke is attached by an adjustable coupling 45 to a piston rod 46, which is attached to a piston in an air cylinder 47 within the lower housing 22. The piston rod extends through the cylinder and out of the houing and its lower end projects through the hub of a gear 48 and carries a plate 49 below the gear. A plurality of screws 50 are mounted in the plate in a circular series and extend parallel to the rod 46. The hub of gear 48 has openings into which all of the screws but one may enter, when the piston rod is moved upward, and the remaining opening contains a block serving as an abutment which is engaged by the end of the last screw and arrests the rising movement of the rod. The extent, to which the rod can rise, is thus determined by the adjustment of the screw which is aligned with the block, and this adjustment determines how near the disk 41 can be moved to the disk 40. The disks 35, 36 and 40, 41 and the belt 42 are a well known form of infinitely variable speed transmission and are typical of such transmissions which may be used in the machine. The disks 40, 41 are the driving disks and, as disk 41 approaches or recedes from disk 40, the disks 35, 36 adjust themselves accordingly. Movement of the disk 41 toward disk 40 increases the speed, at which disks 35, 36 and shaft 34 will be driven, and a movement of disk 41 away from disk 40 decreases the speed of shaft 34.

The pinion 31 (FIG. 6) meshes with a gear 51 on a shaft 52 mounted for rotation in upper and lower bearings 53, 54 carried by the walls of the enclosure 29 and, near its lower end, shaft 52 carries a pinion 55 meshing with an idler pinion 56 (FIG. 7), which in turn meshes with a pinion 57 encircling the sleeve 27, a bearing 58 being interposed between the sleeve and the hub 57a of the pinion. The hub of pinion 57a is enclosed by a magnetic clutch generally indicated at 59 and keyed to the sleeve 27, and, when the clutch is energized, the pinion is secured to the sleeve. Above the clutch 59, a similar clutch 60 is keyed to the sleeve and encloses the lower part of the hub of pinion 31 so that, upon energization of the clutch 60, the pinion 31 is secured to the sleeve. The clutches are energized in alternation and, when clutch 59 is effective, pinion 31 drives gear 51, pinions 55, 56, and 57, sleeve 27, and spindle 26 and because of the use of the idler pinion 56 and of the ratio of gear 51 to pinion 31, the spindle is rotated in the opposite direction to shaft 34 and at half the speed. When the clutch 60 is energized, pinion 31 is connected through the clutch directly to the sleeve 27 and spindle 26, and the spindle is then rotated by shaft 34 in the same direction as the shaft and at the same speed. When pinion 31 is operating through sleeve 27 to drive spindle 26, the pinion continues to rotate gear 51 and pinions 55, 56, and 57 but without effect, since clutch 59 is de-energized and does not connect pinion 57 to sleeve 27.

The pinions 55, 56, and 57 lie in recesses in the bottom wall of the enclosure 29 and a plate 61 partially overlies pinions 55, 56 at a place where their teeth are moving together during operation. A pipe 62 leads upward from an opening through plate 61 and has a curved end pointing toward pinion 31 and gear 51. A quantity of oil is maintained in the enclosure 29 and the pinions 55, 56 act as a gear pump which forces the oil upward through the pipe, so that it is discharged against and lubricates the pinion 31 and gear 51.

The shaft 52 projects downward through bearing 54 and, near its lower end, carries a pulley 63 connected by a belt 64 to a pulley 65 connected to the shaft of a tachometer 66 (FIG. 7) mounted in an opening in the front wall of the upper housing 21.

The quill 23 extends through a cage forming part of a depth control mechanism and comprising an upper ring 67 and a lower ring 68 connected by a plurality of screws 69, on which are mounted nuts 70 serving as abutments and held in place by lock nuts 71. The nuts 70 are engageable alternatively by a lug 72 (FIG. 6) at the upper end of the quill, as the quill is moved downward. The ring 68 (FIG. 3) rests upon a bearing 73, the lower race of which is seated upon springs 74 and, when the quill descends, its lug 72 engages one of the abutments 70 and, upon continued downward movement of the quill, the ring 68 is moved down against the resistance of the springs 74. In such movement, the ring 68 moves away from the plunger of a limit switch LSFL which is mounted on the housing 22 and determines the lower limit of downward feeding movement of the quill, as will be later explained.

The ring 68 carries radially mounted dogs 75, one for each screw 69, and the exposed portions of the dogs are semi-cylindrical. The dogs can be rotated and, when a dog is adjusted so that its flat surface faces down, it is in position to engage the plunger of and actuate a selector switch 2SS to insure that the motor 39 will operate at a low speed during tapping operations and to set up an electrical circuit, by which reversal of the spindle 26 during tapping may be effected.

The machine illustrated is provided with means for supporting a plurality of tool holding members movable selectively into effective position for connection to the spindle 26 and such means take the form of a turret 76 (FIG. 2) which comprises a hollow head 77 and a tool carrier 78 pivotally mounted thereon for rotation at an angle to the axis of the main spindle. A plurality of rotary tool holders 79 are mounted for rotation in the carrier 78 and the carrier can be rotated to bring the tool holders successively into alignment with the main spindle 26 for connection thereto. The turret and the means, by which the individual tool holders are connected to the drive spindle 26, may be of the construction disclosed in my pending application Ser. No. 417,103, filed March 19, 1954, and, now Patent 2,887,894, issued May 26, 1959 when the rotary tool carrier is rotated to present a new tool holder to the main spindle, it rotates a shaft 80 (FIG. 3) mounted in the housing extension 22a and carrying a pinion 81 driving an idler pinion meshing with a gear 82 attached to the ring 68 at the lower end of the depth control cage. The screws 69 of the cage are equal in number to the number of tool holders in the tool carrier and the connections between the carrier and the cage are such that, when a tool holder is brought into effective position in alignment with the main spindle, the cage is rotated so that the screw corresponding to the effective holder is aligned with the lug 72 on the quill. Accordingly, as the quill descends, its lug engages the abutment 70 on the screw and the adjustment of the abutment determines how far the quill can be moved down before the lug will strike the abutment and, upon further movement, actuate limit switch LSFL which acts to stop further downward travel of the quill, when the quill is being advanced by power.

A toothed belt 83 encircles the pulley 33 and connects it to a pulley 84 (FIGS. 2–5, incl.) on a shaft 85 mounted for rotation in bearings in the upper housing 21. A pair of coned disks 86, 87 are mounted on shaft 85 for rotation therewith with disk 86 fast on the shaft and disk 87 movable lengthwise of the shaft. The disk 87 is caused to move toward disk 86 by a lever 88 which is pivoted between lugs 89 on a wall 21a of the upper housing 21 and has a forked end, the arms of which straddle the shaft 85 and engage pins 90 mounted in lugs at opposite sides of the outer race of a bearing 91 encircling the hub of disk 87. The other end of the lever is connected by linkage element 92 to a rod 93 which is connected by an adjustable coupling 94 to a piston rod attached to a piston within a pneumatic cylinder 95. The piston rod extends downward out of the cylinder through a gear 96 (FIG. 2) meshing with the gears 48 and 82 and, below gear 96, the rod carries a plate 97, in which are mounted adjustment screws 98. The hub of gear 96 is provided with openings for receiving the screws 98 with one opening containing an abutment block so that the screw aligned therewith is arrested by the block on upward movement of the rod. The adjustment of the screw so arrested determines the upper limit of movement of the rod 93 by the cylinder 95. In its vertical movements, the rod 93 is guided by an extension 93a projecting upwardly through an opening in the wall 21a and the linkage element is connected by a flexible cable 99 in a casing 99a to a tachometer (FIG. 3).

The disks 86, 87 are connected by a belt 101 to upper and lower disks 102, 103 mounted on a shaft 104 for rotation therewith, the disk 102 being fast on the shaft and disk 103 being movable lengthwise of the shaft and urged toward disk 102 by a spring 105. The shaft is connected by a coupling 106 to a shaft 107 which carries near its lower end a worm 108 (FIG. 3) meshing with a worm gear 109 on a shaft 110. The shaft 110 carries a worm 111 meshing with a worm gear 112 on the shaft 25 (FIG. 9) which has teeth meshing with the rack 24 on the quill 23. The speed, at which shaft 25 is driven by the disks and belt, thus depends on the spacing between the driving disks 86, 87 and the adjustment of the disks is determined by the adjustment of the screws 98 in the plate 97.

The gear 112 (FIGURE 9) is loosely mounted on shaft 25 and has a hub provided with peripheral teeth meshing with internal teeth on a disk 113, which is mounted loosely on the gear hub and is one element of a magnetic clutch. The other element of the clutch is a solenoid 114 keyed to shaft 25 and having a face opposed to the disk 113 and having teeth adapted to mesh with corresponding teeth on the disk. When the clutch is energized, the disk 113 is drawn toward the solenoid 114 and the teeth on the disk and solenoid mesh. Such movement of the disk 113 does not disengage its internal teeth from the teeth on the hub of gear 112, so that, upon meshing of the teeth of the disk and the solenoid, the gear is connected fast to shaft 25 and the shaft is rotated at a rate determined by the relative positions of disks 86, 87.

The rotation of shaft 25 in one direction advances the quill toward and into the workpiece and, when the tool is performing an operation on the workpiece, the rate, at which the quill is fed, should vary with the size of the tool, the material, of which the workpiece is formed, the nature of the operation, etc. Whenever a change in tools is made, the quill is raised so that the old tool lies at a substantial distance from the workpiece and, after the new tool is in place, the quill must be moved back a like distance before the tool engages the workpiece. It is desirable that the approach of the tool to the workpiece be at a faster rate than the tool can be fed when performing an operation on the workpiece, and it is also desirable that the upward movement of the tool be at the faster rate. The fast approach of the tool to the workpiece and the fast retraction of the tool are achieved in the present machine by means for feeding the quill additional to the variable speed transmission including the belt 101 and the pulleys 86, 87, 102, and 103.

A casing 115 (FIGS. 10-12, incl.) is attached to the side wall of the housing extension 22a and is formed with a bore containing a shaft 116, which extends through a centering sleeve 117 lying in aligned recesses in the opposed walls of the casing and the housing extension. The inner end of shaft 116 enters the bore in the housing extension containing shaft 25 and has a tang 118 receivable in a slot 119 in the end of shaft 25 to connect shaft 116 to shaft 25. Shaft 116 extends out of the bore in casing 115 and its exposed end carries a knob 120 by which the shaft can be moved endwise. The shaft 116 has spaced peripheral grooves 121 which alternatively receive a spring-pressed ball detent 122 to hold the shaft either free of or connected to shaft 25. Shaft 116 is mounted for rotation in bearings 123, 124 and, between the bearings, the shaft is encircled by a pinion 125 which has an internal lengthwise slot receiving a key 126 mounted in a keyway in the shaft. With this arrangement, the shaft is continuously connected to the pinion regardless of its connection to the shaft 25.

The teeth of the pinion 125 are adapted to mesh with the teeth 127a on the top of a rack 127, which has teeth 127b on its lower side offset from the teeth 127a and adapted to mesh with the teeth of a pinion 128 fast on a shaft 129. Shaft 129 is mounted in bearings 130, 131 in the casing 115 and carries a gear 132 meshing with the pinion 125 on shaft 116. When the rack 127 is moved endwise with its teeth 127a out of contact with pinion 125, the teeth 127b of the rack are in mesh with pinion 128 and gear 132 then drives pinion 125. Because of the gear ratios involved, the rotation of pinion 125 by the rack teeth 127b is three times as fast as the rotation of the pinion by the rack teeth 127a.

A shaft 133 is connected to one end of the rack 127 by a connection (FIG. 10a) which permits free rotation of the shaft relative to the rack and includes a stud 134 attached to the end of the shaft and having a head 134a in a slot near the end of the rack. A stud 135 is seated in a recess extending from the slot with the head of the stud opposed to the head of stud 134 and a ball 136 is disposed between and in contact with the opposed surfaces of the studs. One end of the shaft 133 extends through the end of the casing 115 remote from the rack 127 and is adapted to be engaged by an adjustable screw 137a in an arm 137 attached to a rod 138 which carries a second arm 139 spaced from arm 137 and is attached to a piston within a fluid-operated cylinder 140.

The supply of fluid to cylinder 140 is controlled by a solenoid-operated valve 141 (FIGS. 16, 17) receiving fluid from a reservoir through a line 142. The valve has a pair of ports connected to opposite ends of the cylinder and the connections include lines 143, 144 leading from the ports to respective passages 145, 146 in a block 147. The passages contain stationary valve members 148, 149 and movable rods 150, 151 co-operating with respective stationary valve members to restrict flow therethrough. The block also includes a by-pass 152 around each stationary valve member and a spring-pressed ball 153 normally closing the by-pass and serving as a check valve to prevent flow through the by-pass in one direction. Beyond the valve members, the passages 145, 146 are connected by respective lines 154, 155 to opposite ends of the cylinder 140. By adjustment of the valve 141, pressure fluid may be supplied through the connection 143, 145, 154 or the connection 144, 146, 155 to the desired end of the cylinder and, when one connection is supplying fluid, the other connection is returning fluid from the cylinder to the valve 141 to flow therefrom to the fluid reservoir through the return line 156.

The action of the rods 150, 151 restricting the flow of fluid to the cylinder is controlled by a plunger 157 (FIG. 16) mounted for endwise movement in a boss 158 secured to the wall of the casing 115 and having a roller 159 at one end and a cross-bar 160 at the other. The cross-bar carries a pair of adjustment screws 161, 162 for engaging the outer end of the rods projecting out of the block 147 and, when the plunger is moved inward, the rods are moved toward their stationary valve members to control flow therethrough. The ends of the rods co-operating with the valve members are of different sizes, so that, when the rods are in effective positions, twice as much fluid may flow through the valve member 149, as through the valve member 148.

A block or drum 163 (FIGS. 10, 11, 14) is mounted fast on shaft 133 and has equiangularly spaced lengthwise slots 164 which terminate short of an enlarged head 165 on the block at one end and are open at the other end. The number of slots is the same as the number of tool holders 79 in the tool carrier 78, in this case, six, and a button 166 serving as an abutment is moved in each slot and is adjustable lengthwise thereof. Regardless of the angular position of the shaft 133 and drum 163, one of the abutments 166 is in effective position for engagement by the arm 139 on rod 138, so that, when fluid is supplied to the cylinder through line 154 to move the piston to the left, as viewed in FIG. 10, the arm 139 will engage the effective abutment and move the drum 163, the shaft 133, and the rack 127. The moving rack will then rotate shafts 116 and 25 to move the quill 23, the drive spindle 26, and the tool in the holder 79 in effective position in the carrier 78 toward the workpiece WP on the supporting table 20.

The point in the movement of the piston to the left (FIGS. 11a, 11b, 11c), at which the arm 139 will engage the effective abutment 166 and start to move the rack, quill, etc., will depend on the position of the abutment lengthwise of its slot. At the end of the piston stroke to the left, the arm 139 actuates a limit switch LS1, which energizes the solenoid 114 to cause the shaft 25 to be connected to the gear 112, so that the shaft will be driven by the second quill moving means comprising the variable speed transmission including the disks 86, 87, 102, 103. By proper setting of an abutment, the movement of the quill, etc. to the point, at which the effective tool is about to engage the workpiece, can be effected by means of the cylinder 140, while the farther movement of the quill, as the tool enters the workpiece, is effected by the second quill moving means. During the movement of the quill by the second moving means, the rotation of shafts 25 and 116 causes pinion 128 to advance the rack 127 and shaft 133, so that the effective abutment 166 moves away from the arm 139 on rod 138.

When the tool has entered the workpiece to nearly the desired depth, the lug 72 on the quill engages the abutment 70 of the depth control mechanism and moves the ring 68 down away from the plunger of the limit switch LSFL. The switch then functions through suitable circuitry to de-energize the solenoid 114 and disengage the clutch, through which the quill feed shaft 25 is driven by the second quill moving means. The switch also functions to reverse the valve 141 so that fluid is supplied to the left-hand or outer end of the cylinder 140 and the piston therein begins to move to the right.

As the shaft 133 is moved outward by the second moving means, its outer end approaches the screw 137a in arm 137 attached to the piston rod 138 and the inward movement of the rod with the piston causes the screw to engage the shaft and return the shaft and the drum 163 to their original positions to the right. In such movement of the shaft, the rack 127 and its teeth 127b initially act through the pinions 125, 128 and gear 132 to rotate shafts 116 and 25 to move the quill upward. In the latter part of the inward movement of the rack, its teeth 127a act through the pinion 125 and shafts 116 and 25 to complete the upward movement of the quill. The movement of the quill and spindle downward by the first moving means, including the cylinder 140, is relatively fast as compared with the movement of the quill and spindle by the second moving means including the variable speed transmission and the upward movement of the quill and spindle is also rapid. The initial part of the downward movement of the quill and spindle and the final part of the upward movement are effected by the rack teeth 127a and are slower than the movement when the rack teeth 127b are effective. When the turret 76 is of the type shown in my Patent 2,887,894, the tool holder in effective position is freed from the spindle in the final part of the upward movement of the quill and the separation requires compression of a spring. The greater power for moving the quill made available by employing the rack teeth 127a acting directly on the pinion 125 may be desirable to accomplish the separation of the tool holder and the spindle, but, if the cylinder 140 is of sufficient power, a single set of rack teeth may be used with such gearing as will produce the desired speed of the quill and spindle.

The stepwise rotation of the shaft 133 to rotate the drum 163 to bring the abutments 166 successively into position for engagement by the arm 139 on the next outward movement of the piston rod is effected through a gear 170 fast on shaft 133 and meshing with a gear 171 on a shaft 172 mounted in bearings in a casing 173 and connected by a coupling 174 to a shaft 175. A gear 176 is fast on shaft 175 and its teeth are in mesh with the gear 96 (FIGS. 13, 19), which meshes with a gear 82 driven through pinion 81 and the idler by the shaft 80. As previously described, the rotary tool holder carrier 78 of the turret 76 is connected to the shaft 80, so that, when the carrier is moved angularly to effect a tool change, the gears 82, 96, and 176 are moved correspondingly. Such a movement of gear 176, as a new tool holder is brought into effective position, causes the shaft 133 and the drum 163 to move to bring a corresponding abutment 166 to be placed in position to be engaged by the arm 139. Also, as the rotary tool holder carrier is moved to present a holder with a new tool to the spindle, the depth control mechanism cage 67, 68, 69 is moved to place an abutment 70 corresponding to the tool in position to be engaged by the lug 72 on the quill and the control devices for the variable speed transmissions for driving the spindle and advancing the quill toward the table are correspondingly adjusted by angular movement of gears 48 and 96.

The tool holder carrier may be advanced stepwise, the depth control mechanism may be correspondingly moved, the two variable speed transmissions may be correspondingly adjusted, and the drum 163 for controlling the approach of the tool to the workpiece may be advanced a step by powerdriven means, and, if desired, the machine may be operated automatically in accordance with a cycle. In such a cycle, the tool holders are presented successively to the spindle, and, when a tool holder is in effective position, the downward movement of the quill by the first moving means is started, the second moving means then continues the movement, and the operation is performed. The depth control mechanism then disables the second moving means and brings the first moving means into action in reverse. When the quill reaches the end of its upward travel, the tool holder carrier, the depth control mechanism cage, and the drum are each advanced a step and the variable speed transmissions are again adjusted, whereupon the first quill moving means is started and the cycle starts again.

The power-driven means for operating the machine in accordance with a cycle includes a Geneva wheel 177 (FIGS. 13, 18, 19) loose on the shaft 175 and having an eccentric bore containing a pin 178 having a semicylindrical end 178a extending into a circular slot in the face of gear 176. The slot has a recess, which the pin can enter by being given a half-turn, and, when the pin is in the recess, the pin connects the wheel and the gear for movement in unison. The pin is rotatable by a knurled-headed rod 179 mounted in the wall of a housing 180 enclosing the wheel and gear and is held in adjusted position by a spring-pressed ball detent 181.

The wheel 177 is rotated stepwise by a roller 182 carried by a disk 183 on a shaft 184 and movable into slot 177a in the wheel. The number of slots is the same as the number of tool holders 79 in the carrier 78, in this case six, and each revolution of the disk 183 causes the wheel to be advanced by the angular distance between adjacent slots or 60°. The shaft 184 carries one element 185 of a one-revolution clutch 186, the other element 187 of which is mounted on a shaft 188 driven through a gear reducer 189 by a motor 190. The clutch element 185 carries an eccentric pin 191 normally engaging and arrested by a shoulder on a lever 192 pivoted at one end on a wall in housing 180 and pivotally attached at its other end to one end of a lever 193 pivoted between its ends on the housing wall. A spring 194 attached at one end to a fixed point and at the other to the lever 192 normally holds the lever against a stop screw 195 with the shoulder on the lever in the path of the pin 191 on the coupling element 192. The lever is displaceable from this position by a solenoid 196 having a core 197 engaging a pin 198 resting on the lever. When the solenoid is energized, the lever 192 is swung clockwise sufficiently to free its shoulder from the pin 191 and the shaft 184 is then rotated with the shaft 188 by the clutch. When the solenoid is de-energized, the spring 194 moves the lever so that its shoulder is again in position to intercept the pin and arrest the disk 183. When the lever 192 is swung to free its shoulder from the pin 191, the lever 193 is also swung until a lateral projection 193a near one end lies in the path of the pin 191. In the operation of the machine, it is intended that the solenoid be momentarily energized so that the shoulder on lever 192 will intercept the pin 191, when the pin has made one revolution and the roller 182 on disk 183 has advanced the wheel 176 by one step, but, if the lever 192 is not released to swing back in time, the projection 193a will intercept the pin and limit the rotation of the disk to one revolution.

When the machine is to be used for an automatic tapping operation, it is desirable to employ the fluid-operated moving means for advancing the quill throughout its entire travel toward the table 20 and the rate, at which the quill is advanced, will vary with the diameter of the tool, the material of the workpiece, etc. As the spindle reversing mechanism illustrated in FIG. 6 rotates the spindle twice as fast in the reverse as in the forward direction, it is also necessary that the movement of the quill in withdrawing the tool from the workpiece be twice as fast as the movement of the tool into the workpiece. The motor 39 is capable of operating in a high and a low speed range and, in tapping operations, it is desirable to insure that the motor operation be confined to the low speed range. In order to accomplish these purposes, the machine is equipped with appropriate means as follows.

When one of the tools carried by a holder 79 in the carrier 78 is a tap, a cam 200 for actuating the plunger 157 is mounted in the corresponding slot 164 in the drum 163. This cam (FIGS. 15, 16) includes a plate 201 held against the outer face of a block 202 by a pair of bolts 203, which pass through slots in the plate and enter a plate 204 lying in the slot 164 against the inner sides of the overhanging edges of the slot. The plate 201 is adjustable transversely of the bolts by a screw 205 threaded into an opening in the plate and having a head 206 of washer form, which enters a recess 207 in the block 202 and prevents endwise movement of the screw. When the screw is turned, the plate 201 is moved transversely of the block as determined by the direction of rotation of the screw.

The plate 201 of the cam lies in position to engage the roller 159 on the plunger 157 which controls the position of the rods 150, 151, and determines the rate of supply of the fluid through valve member 148 and the line 154 to the inner end of the cylinder 140. Accordingly, in the initial part of a tapping operation, the engagement of the arm 139 on the piston rod 138 with the abutment 166 in the drum slot 163 in effective position causes the drum 163 to be moved outward as fluid is supplied at the usual rate to the inner end of the cylinder 140, and such movement of the drum moves the rack 127 to cause rotation of shafts 116 and 25 and to move the quill downward. As the tapping tool is about to strike the workpiece, the plate 201 of the cam 200 engages the roller 159 and moves the rods 150, 151 inward, so that the rate of supply of fluid to the cylinder 140 is decreased and the piston rod 138 continues its movement outward but at a slower rate determined by the extent to which the flow through valve member 148 is reduced by the rod 150. The position of the rod in relation to the valve member is determined by the lateral position of the plate 201 and the adjustment of the plate thus determines the speed, at which the quill will be advanced while the tap is entering the workpiece.

Just before the tap reaches the lower end of its penetration of the workpiece, the lug 72 on the quill engages an abutment 70 of the depth control mechanism and moves the cage 67, 68, 69 downwardly so that the ring 68 moves away from the limit switch LSFL. The limit switch then causes the fluid supply valve 141 to reverse flow of fluid to the cylinder 140 and the piston starts to move inward with the arm thereon engaging shaft 133 and moving the drum 163 and the rack 127. For tapping, the appropriate trip dog 75 on the ring 68 is placed in position to actuate the switch 2SS and, when that switch has been actuated, the operation of the limit switch LSFL, as described, causes the solenoid 59 to be de-energized and the solenoid 60 to be energized so that the direction of spindle rotation is reversed and the rate of rotation is doubled. Because of this increase in the rate of rotation of the spindle as the tap is leaving the workpiece, it is necessary that the piston in the cylinder 140 move twice as fast in the reverse as in the forward direction. During such reverse movement, the piston is supplied from valve 141 through the connection 144, 146, 154 and the connection includes valve member 149 and the rod 151. As previously explained, the effective end of rod 151 is so shaped as to permit twice the flow through valve member 149 as is permitted through valve member 148 by rod 150. Accordingly, during the reverse movement of the piston, twice as much fluid is supplied to the cylinder as during the outward movement of the piston. The fluid issuing from the inner end of the cylinder returns to the valve through line 154 and the by-pass around the valve 148, 150 permits the escape from the cylinder at the proper rate.

To enable the operator to cause the motor to operate at low speed when a particular tool holder is in effective position, a switch 1SS (FIG. 2) is mounted adjacent the hub of gear 48 and a plurality of dogs 210 are mounted in the hub of the gear and are adjustable to and from a position, in which they actuate the switch as the gear is rotated. The dogs correspond in number and position to the tool holders 79 in the carrier 78 and, as the carrier rotates to present a new tool holder to the spindle, the corresponding dog is moved so that, if properly adjusted, it will actuate the switch. The switch, when so operated, acts through appropriate means to place the high speed circuits of the motor out of action. The actuation of the switch 2SS by a dog 75, as above described, sets up the electrical circuitry for tapping and insures low speed motor operation regardless of the setting of the corresponding dog 210.

In the use of the machine for automatic operation, the quill 23 operates a limit switch LS4 (FIG. 8) as it approaches the end of its upward travel, and the actuation of the switch energizes solenoid 196 to cause shaft 184 to be rotated through the coupling 186, 187 by shaft 188. Shaft 184 makes one revolution and the roller 182 on the disk 183 on the shaft advances the Geneva wheel 177 one-sixth of a turn. At this time, the wheel is connected to gear 176 by pin 178 and the rotation of the gear through an angle of 60° acts through gears 82, 96, and 48 to advance the depth control mechanism cage by one step and to advance by a like amount the disks 49 and 97 carrying the screws which are part of the control means for the two variable speed transmissions. The rotation of gear 176 by one step similarly advances shaft 133 to bring the next slot 164 on drum 163 into effective position. As the drum approaches the end of the step, a trip dog 167 on the head 165 of the drum 163 actuates limit switch LS3 and this causes the fluid control valve 141 to be adjusted to supply fluid to the inner end of cylinder 140. There are as many trip dogs 167 carried by the head as there are slots 163 and the trip dogs successively actuate a second limit switch LS5, which is in circuit with limit switch LS4 and must be closed if the closing of limit switch LS4 by the rising quill is to cause the drum 163 to be indexed. The trip dogs 167 are adjustable to a position, in which they are ineffective to operate the limit switches LS3 and LS5 and, by setting the dogs properly, it is possible to cause the power index mechanism to function through all or only a part of the complete cycle of operations.

When fluid is supplied to the inner end of cylinder 140, the piston rod 138 with its arms 137, 139 begins to move outwardly. The total outward travel of the piston rod is such as to move the quill from its uppermost position to its lowermost position required to cause a tool to enter the workpiece to the desired depth. Until the arm 139 strikes an abutment 166 on drum 163, the quill remains at rest and the position, at which the abutment is placed on the drum, depends on the height above the table 20 of the spot on the workpiece where the tool in effective position is to engage the workpiece. As soon as the arm 139 reaches the abutment, the shaft 133 and rack 127 are moved to cause the downward movement of the quill and such movement continues until the arm 139 engages the limit switch LS1. Actuation of the limit switch energizes the solenoid 114 to cause the shaft 25 to be connected to the gear 112 and thereafter the shaft is driven by the second quill moving means including the variable speed transmission comprising disks 86, 87, 102, 103. The rotation of shaft 24 causes a corresponding rotation of shaft 116, which in turn causes rack 127 and shaft 133 to move to the left, as shown in FIG. 11c. Such movement continues with the abutment 166 moving away from arm 139 until the limit switch LSFL is released by the depth control mechanism cage, whereupon the fluid valve 141 is adjusted to supply fluid to the outer end of cylinder 140 and cause the return of the piston rod, shaft 133, and rack 127. In a tapping operation, in which the cylinder 140 is to effect the total movement of the quill, the effective abutment is so placed as to be engaged by the arm 139 at an early stage in the outward movement of the arm with the piston rod and, just before the tool reaches the work, the cam 200 cuts down the flow of fluid to the cylinder and reduces the rate of advance to the piston rod.

When the machine is to be used for manual drilling, the shaft 116 is moved endwise by the knurled head 120 to free it from shaft 25 and the rod 179 is used to turn the pin 178, to disconnect the Geneva wheel 176 from the gear 177. To start the forward rotation of the spindle 26, the operator operates a push button switch to energize solenoid 59 and he then rotates the shaft 25 by the handles 212 secured to a hub 213 mounted for angular adjustment on a disk 214 fast on the shaft. When the tool is close to the workpiece, the operator actuates a push button switch to cause solenoid 114 to be energized and, thereafter, shaft 25 is rotated by the second quill moving means including the variable speed transmission comprising disks 86, 87, 102, 103. When the hole has been drilled to the desired depth, the ring 68 of the depth control mechanism moves away from limit switch LSFL with the result that the solenoid 114 is de-energized. Since the trip dog 75 corresponding to the tool holder in effective position has not been set to operate the switch 2SS, the rotation of the spindle in the forward direction continues as the operator raises the quill to move the drill out of the workpiece by means of the handles 212.

When the machine is to be used for a manual tapping operation, the procedure is as described in connection with manual drilling, except that the trip dog 75 corresponding to the tool holder in effective position is set to actuate the switch 2SS and, when the bottom of the tapped hole is reached and the ring 68 moves out of engagement with the limit switch LSFL, the solenoid 114 is de-energized and the circuit through solenoid 59 is opened so that the spindle is at rest. As the operator reverses the direction of rotation of shaft 25, a circuit is established through solenoid 60 so that, as the quill is raised, the spindle is rotated in the reverse direction. The closing of the circuit through solenoid 60 is effected by a switch 3SS mounted within the hub 213 at one side of shaft 25 and having an operating plunger 215 and terminals connected to conductors in a cable 216 wound about the shaft. The plunger of the switch is attached to a piston 217 in a bore in a block loosely encircling the shaft 25 and a key 219 on the shaft lies in an opening in the block transverse to the bore and slightly larger than the key. The piston 217 is maintained in contact with the key at all times by a spring. With this arrangement, the counter-clockwise movement of the shaft, as viewed in FIG. 9a lowers the quill and moves the key away from the plunger. When the shaft is moved clockwise to raise the quill, the key moves toward the plunger (FIG. 9b) to actuate the switch, as above described.

As will be apparent from the foregoing, the new machine can be operated to advance a tool from its initial upper position at a rapid rate toward the workpiece and, just before the tool reaches the workpiece, the variable speed transmission becomes effective and thereafter advances the tool at a rate determined by the nature of the operation, the material of the workpiece, etc. The total upward movement of the tool is effected by the fluid-operated means at the rapid rate. In an automatic tapping operation, the fluid operating means advances the tool rapidly toward the workpiece and then advances the tool more slowly during the actual tapping operation. The retraction of the tool by the fluid-operated means is at the rapid rate.

The machine may be operated wholly automatically with the tool holder carrier advanced stepwise to bring tools in its holders successively into effective position and with corresponding adjustments of the depth control mechanism, the variable speed transmissions, and the drum carrying the abutments, which determine the length of the fast approach movement of the tool toward the workpiece. Also, the machine may be operated automatically for part of the cycle and manually for the rest or it may be operated wholly manually.

I claim:

1. A machine for performing operations on workpieces, which comprises co-operating tool holding and workpiece supporting members, one of the members being stationary during the operation of the machine while the other member is movable toward and away from the stationary member, a rotary spindle attachable to the movable member, the spindle and the movable member being mounted for movement in unison axially of the spindle, adjustable means for driving the spindle at different speeds, a rack connected to the spindle for movement therewith axially of the spindle, a pinion engaging and rotatable to move the rack, means for rotating the pinion in both directions to move the spindle and the movable member both toward and away from the stationary member, a second means for rotating the pinion to move the spindle and the movable member toward the stationary member only, the two pinion rotating means operating in alternation with the second means causing the final portion of the movement of the spindle and the movable member toward the stationary member, and means operating, after a predetermined movement of the spindle and the movable member toward the stationary member, to disable the first pinion rotating means and make the second pinion rotating means effective.

2. The machine of claim 1, in which the first pinion rotating means is fluid-operated.

3. The machine of claim 1, in which the second pinion rotating means is adjustable to vary the rate of movement of the spindle and the movable member relative to the stationary member and which includes a plurality of tool holding members, a carrier supporting the tool holding members and movable to place the members selectively in effective position, means operated by the carrier as it brings a tool holding member into effective position and adjusting the spindle driving means, and a second means operated by the carrier as it brings a tool holding member into effective position and adjusting the second pinion rotating means.

4. The machine of claim 1, in which the spindle is mounted in an axially movable quill, a plurality of tool holding members are connectable separately to the spindle, a carrier supporting the tool holding members is movable to place the members selectively in effective position for connection to the spindle, the workpiece supporting member is a table, which is stationary during the operation of the machine, adjustable means are provided for determining the length of travel of the quill toward the table produced by the first pinion rotating means, and means actuated by the quill as it is moved away from the table adjust the determining means for the next movement of the quill toward the table.

5. A machine for performing operations on workpieces, which comprises a drive spindle, an axially movable quill, in which the spindle is mounted for rotation, a plurality of tool holders separately connectable to the spindle, a carrier for the tool holders movable to place the holders selectively in position for connection to the spindle, co-operating means on the spindle and tool holders for connecting them, a stationary workpiece supporting table, a rack attached to the quill and extending axially of the spindle, a pinion engaging the rack and rotatable to move the rack and quill in a direction axially of the spindle means for rotating the pinion to move the quill toward and away from the table, a second means for rotating the pinion to move the quill but toward the table only, the two pinion rotating means being operable in alternation and means actuated by the quill in its return movement from the table for determining the length of the next movement of the quill toward the table produced by the first pinion rotating means.

6. The machine of claim 5, in which the determining means includes a rotary drum connected to the rack for endwise movement therewith, a plurality of abutments mounted on the drum for lengthwise adjustment, and means for rotating the drum stepwise the rotation of the drum placing the abutments selectively in effective position for engagement by a part of the first pinion rotating means to move the quill toward the table.

7. The machine of claim 6, in which the first pinion rotating means includes a fluid-operated piston and an arm connected to the piston and engaging the abutment in effective position.

8. The machine of claim 7, in which a second arm attached to the piston is operative to move the drum to cause a return movement of the quill from the table.

9. A machine for performing operations on workpieces, which comprises an axially movable rotatable spindle, a plurality of tool holders connectable to the spindle, a carrier for the tool holders movable to present them selectively to the spindle for connection thereto, adjustable means for driving the spindle at different speeds, a table for supporting the workpieces, a rack connected to the spindle for movement therewith axially of the spindle, a pinion engaging the rack and rotatable to move the rack and spindle means for rotating the pinion to move the spindle axially both toward and away from the table, a second means for rotating the pinion to move the spindle axially but toward the table only, the second pinion rotating means being adjustable, and connections between the carrier and the driving means and the second pinion rotating means, through which connections the movement of the carrier to present a tool holder to the spindle effects a corresponding adjustment of the driving means and the second pinion rotating means.

10. The machine of claim 9, in which the driving means and the second pinion rotating means both include variable speed transmissions and the movement of the carrier adjusts both transmissions.

11. A machine for performing operations on workpieces, which comprises an endwise movable quill; a spindle mounted in the quill for axial movement therewith and rotation relative thereto, a tool holder connected to the spindle, means for rotating the spindle, a table for supporting workpieces, a rack connected to the spindle and moveable therewith axially of the spindle, a pinion engaging the rack and rotatable to move the rack and spindle, means for rotating the pinion to move the quill toward and away from the table, the moving means including a member movable endwise, an abutment connected to the member and adjustable in the direction of movement of the member, a fluid-operated piston, an arm connected to the piston and engageable with the abutment to move the member in one direction and a second arm connected to the piston and engageable with the member to move the member in the opposite direction, and a second means for rotating the pinion to move the quill but toward the table only.

12. A machine for performing operations on workpieces, which comprises an axially movable quill, a rotary spindle mounted in the quill, axially thereof a carrier movably mounted on the quill, a plurality of tool holders mounted in the carrier and connectable separately to the spindle, the tool holders being presented selectively to the spindle for connection thereto by movement of the carrier, a table for supporting workpieces, a rack mounted on the quill axially thereof, a pinion engaging the rack and rotatable to move the rack and quill means for rotating the pinion to move the quill both toward and away from the table, a second means for rotating the pinion to move the quill but toward the table only, the second pinion rotating means being adjustable, means for limiting the movement of the quill toward the table, the limiting means being adjustable and including a plurality of abutments corresponding to respective tool holders in the carrier, adjustable means for driving the spindle, means for determining the length of the movement of the quill toward the table by the first pinion rotating means, the determining means being adjustable and including a plurality of abutments corresponding to respective tool holders in the carrier, and means connecting the tool holder carrier to the spindle driving means, the second pinion rotating means, the limiting means, and the determining means and acting, as the carrier is moved to present a tool to the spindle, to cause corresponding adjustments of the spindle driving means and second pinion rotating means and to move corresponding abutments of the limiting means and the determining means into effective position.

13. The machine of claim 12, which includes means for causing the tool holder carrier to advance to present a tool to the spindle.

References Cited in the file of this patent

UNITED STATES PATENTS

| | | |
|---|---|---|
| 2,587,352 | Manning | Feb. 26, 1952 |
| 2,680,182 | Chambers | June 1, 1954 |
| 2,796,767 | Carpenter | June 25, 1957 |
| 2,893,270 | Hodgson | July 7, 1959 |